United States Patent
Loane

(10) Patent No.: US 12,517,142 B2
(45) Date of Patent: Jan. 6, 2026

(54) DETECTION OF NICOTINE, CANNABINOIDS AND DRUGS OF ABUSE ON VAPING DEVICE SURFACES AND VAPING LIQUID FORMULATIONS

(71) Applicant: Veriteque USA Inc., Carson City, NV (US)

(72) Inventor: Christian Loane, Carson City, NV (US)

(73) Assignee: Veriteque USA Inc., Carson City, NV (US)

( * ) Notice: Subject to any disclaimer, the term of this patent is extended or adjusted under 35 U.S.C. 154(b) by 0 days.

(21) Appl. No.: 17/770,624

(22) PCT Filed: Oct. 21, 2020

(86) PCT No.: PCT/US2020/056643
§ 371 (c)(1),
(2) Date: Apr. 21, 2022

(87) PCT Pub. No.: WO2021/081083
PCT Pub. Date: Apr. 29, 2021

(65) Prior Publication Data
US 2022/0357349 A1    Nov. 10, 2022

Related U.S. Application Data

(60) Provisional application No. 62/923,985, filed on Oct. 21, 2019.

(51) Int. Cl.
*G01N 33/94* (2006.01)
*G01N 33/52* (2006.01)

(52) U.S. Cl.
CPC .......... *G01N 33/94* (2013.01); *G01N 33/521* (2013.01)

(58) Field of Classification Search
None
See application file for complete search history.

(56) References Cited

U.S. PATENT DOCUMENTS

| 3,955,926 A | 5/1976 | Fischer |
| 4,771,005 A | 9/1988 | Spiro |

(Continued)

FOREIGN PATENT DOCUMENTS

| WO | 9620405 A1 | 7/1996 |
| WO | 9845714 A1 | 10/1998 |
| WO | 2021081083 A1 | 4/2021 |

OTHER PUBLICATIONS

Davis et al., Acid-Base Reactions in Organic Solvents. Behavior of Some Halogenated Derivatives of Phenolsulfonephthalein with Different Classes of Organic Bases in Benzene, Journal of Research of the National Bureau of Standards, Research Paper RP1, vol. 41, Jul. 1948 (Year: 1948).*

(Continued)

*Primary Examiner* — Maris R Kessel
*Assistant Examiner* — Mickey Huang
(74) *Attorney, Agent, or Firm* — Gavrilovich, Dodd & Lindsey LLP

(57) ABSTRACT

Provided herein is a portable test device, mass manufacture method and method of use for identification of at least one target drug of abuse. The portable detection kit can include a catalytic reagent, a solid support carrier, and an absorbent material. The colorimetric reagent and the catalytic reagent can be are affixed to the solid support carrier to form a reaction zone thereon. The colorimetric reagent and the catalytic reagent are configured to undergo chemical reaction with at least one target drug of abuse to produce a visible color change. The at least one target drug of abuse is selected from the group consisting of nicotine, cannabinoids, (Continued)

amphetamines, opioids, or cocaine. A target drug of abuse can be on vaping device surfaces and/or within vaping liquid formulations.

9 Claims, 5 Drawing Sheets

(56) References Cited

U.S. PATENT DOCUMENTS

| | | | | |
|---|---|---|---|---|
| 4,812,413 | A | * | 3/1989 | Glattstein ............ G01N 33/946 436/92 |
| 4,840,912 | A | | 6/1989 | Glattstein |
| 5,498,547 | A | * | 3/1996 | Blake .................. G01N 31/221 436/124 |
| 5,817,012 | A | | 10/1998 | Schoendorfer |
| 6,383,736 | B1 | | 5/2002 | Titmas |
| 9,759,733 | B1 | * | 9/2017 | Callahan .............. G01N 33/946 |
| 2009/0029480 | A1 | | 1/2009 | Loane |
| 2010/0297775 | A1 | * | 11/2010 | Green ................ G01N 33/9446 422/400 |
| 2013/0130396 | A1 | * | 5/2013 | Knill ...................... G01N 33/94 436/96 |
| 2016/0370331 | A1 | | 12/2016 | Nakada et al. |
| 2018/0313765 | A1 | | 11/2018 | Landers et al. |
| 2021/0302446 | A1 | * | 9/2021 | Joy ........................ G01N 33/94 |

OTHER PUBLICATIONS

Cope et al, Simple colorimetric test to quantify exposure to environmental tobacco smoke: occupational health study, Ann Clin Biochem 2000; 37: 795-796 (Year: 2000).*

International Search Report and Written Opinion corresponding to International Patent Application No. PCT/US2020/056643 dated Jan. 27, 2021 (10 pages).

Office Action, China National Intellectual Property Administration, Application No. 202080089117.5, Dec. 31, 2024.

* cited by examiner

NICOTINE DETECTION

Un-reacted paper strip | Negative result | Positive result

AMPHETAMINE DETECTION

Unreacted | Reacted

CANNABINOID DETECTION

Unreacted        Reacted

OPIOID DETECTION

Unreacted        Reacted

DETECTION OF NICOTINE, CANNABINOIDS AND DRUGS OF ABUSE ON VAPING DEVICE SURFACES AND VAPING LIQUID FORMULATIONS

CROSS-REFERENCE TO RELATED APPLICATIONS

This application is a U.S. National Stage application of International Patent Application No. PCT/US2020/056643, filed Oct. 21, 2020. International Patent Application No. PCT/US2020/056643 claims the benefit of and priority under U.S. Provisional Patent Application No. 62/923,985, filed on Oct. 21, 2019, entitled "Detection of Nicotine, Cannabinoids and Drugs Of Abuse On Vaping Device Surfaces and Vaping Liquid Formulations," the entirety of each of these applications is incorporated by reference.

FIELD OF THE INVENTION

Embodiments of the disclosure generally relate to detection on vaping device surfaces and in vaping liquid formulations of drugs of abuse.

BACKGROUND

Use of electronic cigarettes (EC) has dramatically increased in the United States since 2010 with 37% between 2014 and 2019.[3] Concerns about the possibility of adverse health effects to primary users and people exposed to EC vapors has also risen dramatically. Reports of people ingesting restricted substances from vaping devices, is also increasing.

Thus, there is a need for new kits and methods to identify harmful and illicit substances within e-liquids and vaping products, as they become commercially produced, homemade or of clandestine counterfeit formulations.

SUMMARY OF THE INVENTION

Embodiments of the present disclosure relate to a portable test kit capable of identifying nicotine, cannabinoids and drugs of abuse detection on vaping device surfaces and in vaping liquid formulations, based on simple rapid presumptive colorimetric color change. A process to mass produce the portable test kit and achieve long term commercial shelf life in the range of 1 to 5 years and a method to use said portable test kit. Moreover, the methods and kits discussed herein are economically cheaper than current methods and kits.

While embodiments of the disclosed test kit are shown and described in detail herein, these embodiments are not to be considered as limited to the exact form disclosed, and that changes in detail and construction may be made therein without departing from the spirit thereof.

In an embodiment, an objective of the present disclosure is to design a low cost, mass producible, field deployable, presumptive spot test kit which will facilitate identification of nicotine, cannabinoids and drugs of abuse on the surfaces of e-devices and in e-liquid or e-juice formulations.

In another embodiment, it is a further objective of the present disclosure to design both a presumptive kit, constructed of paper and an absorbent material (e.g., cotton swabs, wipes, etc.) configured to absorb color change reagents. The components of the kit can be constructed from non-hazardous materials.

In a further embodiment, another objective of the present disclosure is to design an extremely portable presumptive test kit, which has true low cost, mass manufacture capability, on the order of millions of units per annum, while also achieving commercial kit shelf life, in the order of one or more years (e.g., 1 to 5 years) and a reduced false detection rate as compared to existing designs.

In an embodiment, a portable detection kit is provided. The portable detection kit can be configured to identify the presence of at least one target drug of abuse. The kit includes a colorimetric reagent, a catalytic reagent, a solid support carrier upon which the colorimetric reagent and the catalytic reagent are affixed to form a reaction zone thereon, and an absorbent material. The colorimetric reagent and the catalytic reagent are configured to undergo chemical reaction with at least one target drug of abuse to produce a visible color change, also referred to as a presumptive colorimetric indication. The at least one target drug of abuse is selected from the group consisting of nicotine, cannabinoids, amphetamines, opioids (e.g., heroin), or cocaine). As discussed in greater detail below, the target drug of abuse can be identified on the surface (e.g., a surface of an electronic devices (e-devices) or within electronic juice (e-liquid or e-juice) formulations configured for use with electronic smoking devices (e.g., e-cigarettes).

In an embodiment, the colorimetric reagent and the catalytic reagent are configured to undergo chemical reaction with the at least one target drug of abuse. (e.g., at least one target analyte present within a drug of abuse) in the form of liquids, gels, or solid powders that are pure or admixed with a cutting or diluting agents. Examples of cutting or diluting agents can include, but are not limited to, baking powder, methylsulfonylmethane (MSM), borax, sodium hydroxide, detergents, or quinine.

In an embodiment, the colorimetric reagent is selected from the group consisting of 3',3",5',5"-Tetraiodophenolsulfonephthalein, tetrabromophenolphthalein ethyl ester and its salts (e.g., potassium salts), bromophenol blue, chlorophenol red, congo red, methyl yellow, methyl orange, methyl purple, methyl red, ethyl orange, 4-(4-dimethylamino-1-naphthylazo)-3-methoxybenzenesulfonic acid, Fast blue B salt, bromocresol green, Fast Black K salt, bromothymol blue, bromochlorophenol blue, bromocresol purple, 3,4,5,6-tetrabromophenolphthalein ethyl ester and its salts (e.g., potassium salts), tetrabromophenol blue or tetrabromophenolphthalein, or 4-bromobenzenediazonium tetrafluoroborate.

In an embodiment, the colorimetric reagent is 3',3",5',5"-Tetraiodophenolsulfonephthalein.

In an embodiment, the catalytic reagent increases the rate of appearance of the visible color change resulting from chemical reaction between the colorimetric reagent and the target drug.

In an embodiment, the catalytic reagent is an acid. Examples of the acid include, but are not limited to, mineral acids or organic acids in solid or liquid form. In other examples, the acid is a solid form, including but not limited to, oxalic acid, citric acid, sodium bisulfate. In further examples, the acid citric acid in solid form.

In an embodiment, the absorbent material is a cotton swab or a wipe formed from natural or synthetic fibers. As an example, a cotton swab can be a single tipped plastic handle cotton swab. In further examples, the cotton swab may be packaged into any form of suitable container that allows mobility, shipping and long term shelf life and storage.

In an embodiment, the suitable container can be in the form of a form fill seal pouch (e.g., that is 12 micron thick), aluminum (e.g., 7 micron thick), or poly ethylene (e.g., 50 micron thick). In further embodiments, the suitable container can be a Mylar pouch heat seal pouch.

In an embodiment, the solid support carrier is a paper card, a paper sheet, a synthetic paper, Whatman filter paper, polypropylene, or polyethylene synthetic paper.

In an embodiment, the visible color change includes:
(Control—Negative) no color change—Yellow,
(Positive Nicotine Indication) Color Rapid change from Yellow to Blue, or
(Positive Amphetamine Indication) Color Rapid change from Yellow to Blue.

In an embodiment, the visible color change includes:
(Control—Negative) no color change—light brown;
(Positive Cannabinoid Indication) Color Rapid change from Brown to Pink/Red; or
(Positive Amphetamine Indication) Color Rapid change from Brown to Purple.

In an embodiment, the visible color change includes:
(Control—Negative) no color change—brown;
(Positive Cannabinoid Indication) Color Rapid change from Brown to Purple; or
(Positive Amphetamine Indication) Color Rapid change from Brown to Red.

In an embodiment, the visible color change includes:
(Control—Negative) no color change—Tan;
(Positive Opioid Indication) Color Rapid change from Tan to Red, dark brown, black.

In an embodiment, a method of fabricating a portable detection kit for identifying at least one target drug of abuse is provided. The method includes preparing a dry mixture including a dry colorimetric reagent and a dry catalytic reagent. The method also includes affixing the dry mixture to a solid support carrier to form a reaction zone thereon. The method additionally includes storing an absorbent material. The colorimetric reagent and the catalytic reagent are configured to undergo chemical reaction with at least one target drug of abuse to produce a visible color change. The at least one target drug of abuse is selected from the group consisting of nicotine, cannabinoids, amphetamines, opioids, or cocaine.

In an embodiment, the colorimetric reagent and the catalytic reagent are configured to undergo chemical reaction with the at least one target drug of abuse in the form of liquids, gels or solid powders that are pure or admixed with a cutting agent.

In an embodiment, the colorimetric reagent is selected from the group consisting of 3',3",5',5"-Tetraiodophenolsulfonephthalein, tetrabromophenolphthalein ethyl ester and its salts, bromophenol blue, chlorophenol red, congo red, methyl yellow, methyl orange, methyl purple, methyl red, ethyl orange, 4-(4-dimethylamino-1-naphthylazo)-3-methoxybenzenesulfonic acid, Fast blue B salt, bromocresol green, Fast Black K salt, bromothymol blue, bromochlorophenol blue, bromocresol purple, 3,4,5,6-tetrabromophenolphthalein ethyl ester and its salts, tetrabromophenol blue or tetrabromophenolphthalein, or 4-bromobenzenediazonium tetrafluoroborate.

In an embodiment, the colorimetric reagent is 3',3",5',5"-Tetraiodophenolsulfonephthalein.

In an embodiment, the catalytic reagent increases the rate of appearance of the visible color change resulting from chemical reaction between the colorimetric reagent and the at least one target drug of abuse.

In an embodiment, the catalytic reagent is a mineral acid or an organic acid in solid or liquid form.

In an embodiment, the acid is in a solid form and comprises at least one of oxalic acid, citric acid, or sodium bisulfate.

In an embodiment, the absorbent material is a cotton swab, or wipe formed from natural or synthetic fibers.

In an embodiment, storing the absorbent material comprises packaging the absorbent material in a container.

In an embodiment, the container is in the form of a form fill seal pouch 12 micron thick, aluminum 7 micron thick, polyethylene 50 micron thick, or a Mylar pouch heat seal pouch.

In an embodiment, the solid support carrier is a paper card, a paper sheet, synthetic paper, Whatman filter paper, polypropylene, or polyethylene synthetic paper.

In an embodiment, affixing the dry mixture to the solid support carrier includes printing the dry mixture to its surface to form the reaction zone.

In an embodiment, printing the dry mixture can include any mass scale printing process. Examples of printing processes can include, but are not limited to, letterpress, rotary gravure, rotary screen printing, flat screen printing, tampography, wax printing, contact dosing, ultrasonic sputter, flexographic, spray or drop on demand printing.

In an embodiment, the colorimetric reagent, the catalytic reagent, and the alcoholic solvent are combined in a ratio of about 6 g to about 9 g colorimetric reagent:about 50 g to about 70 g catalytic reagent:about 2 L to about 2.5 L alcoholic solvent. As an example, the ratio can be about 1:5:180) by weight, to achieve the desired viscosity of final reactive ink solution or suspension. In other embodiments, a ratio of the colorimetric reagent, the catalytic reagent, and alcoholic solvent is about 1:5:200 by weight, about 1:5:250 by weight, about 1:1:100 by weight, about 1:5:50 by weight, or about 1:5:150 by weight.

In other embodiments, the printed solid support carrier is air dried and then cut or formed into any desired end use format. Subsequently, the solid support carrier can be, packaged in hermetically sealed light, air and moisture proof packaging for ease in transport, handling and long term storage prior to use.

In an embodiment of the method, the visible color change includes:
(Control—Negative) no color change—Yellow,
(Positive Nicotine Indication) Color Rapid change from Yellow to Blue, or
(Positive Amphetamine Indication) Color Rapid change from Yellow to Blue.

In an embodiment of the method, the visible color change includes:
(Control—Negative) no color change—light brown;
(Positive Cannabinoid Indication) Color Rapid change from Brown to Pink/Red; or
(Positive Amphetamine Indication) Color Rapid change from Brown to Purple.

In an embodiment of the method, the visible color change includes:
(Control—Negative) no color change—brown;
(Positive Cannabinoid Indication) Color Rapid change from Brown to Purple; or
(Positive Amphetamine Indication) Color Rapid change from Brown to Red.

In an embodiment of the method, the visible color change includes:
(Control—Negative) no color change—Tan;
(Positive Opioid Indication) Color Rapid change from Tan to Red, or dark brown, or black.

Also provided herein is a method of using the portable detection kit. As an example, the absorbent material (e.g., a cotton swab) and the solid support carrier with the dry mixture affixed thereon are removed from shipping packaging. An operator holds the absorbent material (e.g., a cotton swab shaft) and applies the absorbent material to a surface to be inspected (e.g., a suspect e-device mouthpiece) and/or a sample of e-juice. The absorbent material can further transfer a portion of the absorbed sample to the reaction zone of the solid support carrier, gently dabbing and swirling for approximately 10 seconds. This mixes the colorimetric reagent with the absorbent material to facilitate a presumptive colorimetric reaction.

BRIEF DESCRIPTION OF THE DRAWINGS

Other objectives of this invention will appear in the description and claims, with reference being made to the accompanying drawings, which form part of the specification.

DETAILED DESCRIPTION

Figure 1:
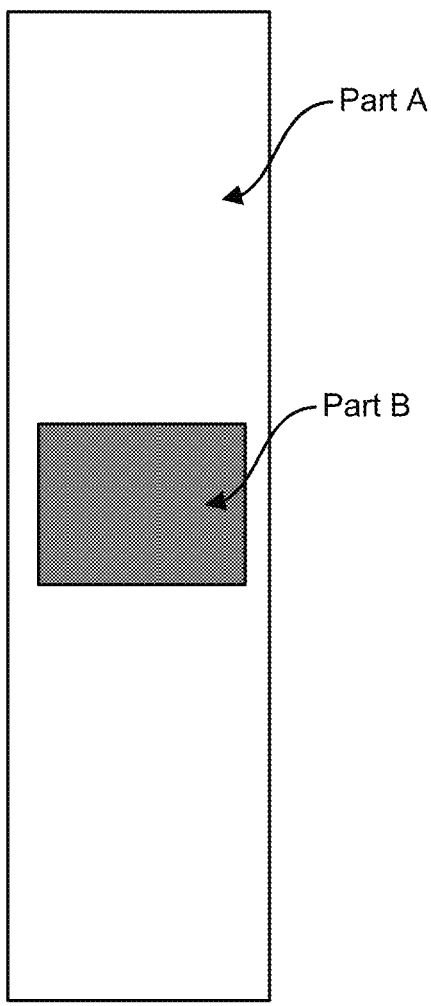
FIG. 1 illustrates a diagnostic test paper strips made in accordance with embodiments of the present disclosure; (Part A) is a solid support carrier (e.g., plain white 300 gsm paper card), (Part B) is a reaction zone formed from powder dye and catalytic reagent printed thereon.
Figure 2:
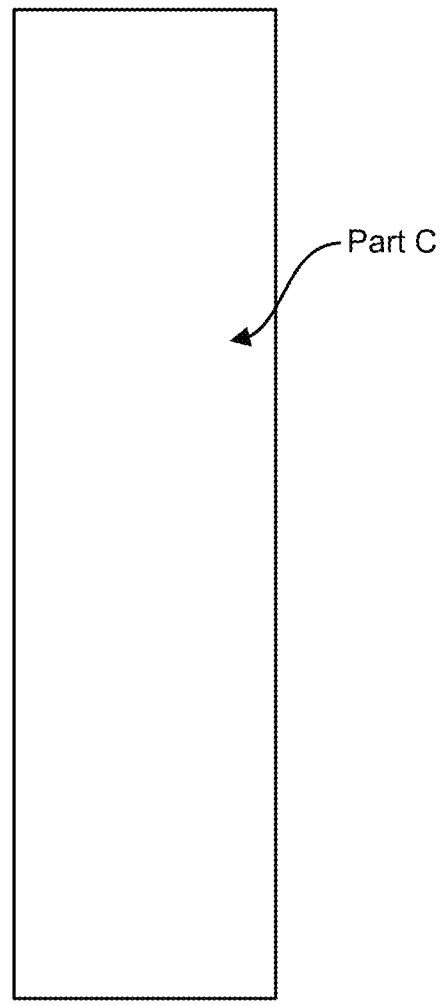
FIG. 2 illustrates a diagnostic test paper strips made in accordance with this invention; (Part C) dip dried cellulose based or synthetic paper with (i) dye reagents (ii) catalytic reagents dry adsorbed within matrix.
Figure 3:
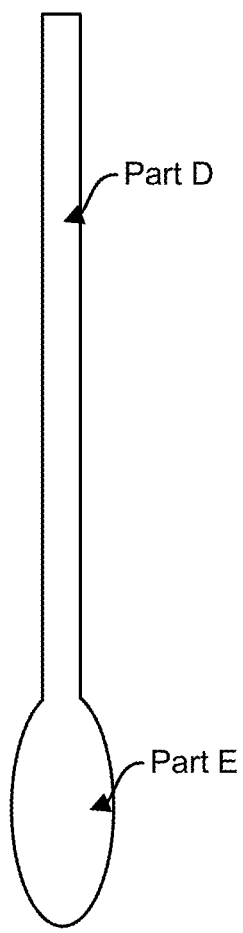
FIG. 3 illustrates a cotton swab made in accordance with embodiments of the present disclosure; (Part D) Plastic polypropylene shaft handle. (Part E) Cotton swab head.
Figure 4:
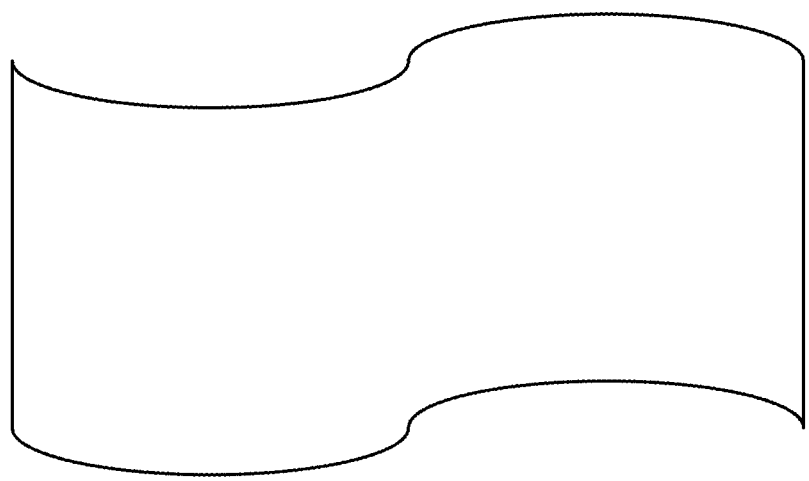
FIG. 4 illustrates a wipe made in accordance with embodiments of the present disclosure, pre-wetted with any combination of (i) Dye and (ii) Catalytic reagent.

The present disclosure provides a portable detection kit for identifying at least one of nicotine, cannabinoids, amphetamines, opioids, cocaine, and other drugs of abuse. In certain embodiments, the drugs of abuse can be identified on the surface of electronic devices (e-devices) or in electronic juice (e-juice) formulations. However, it may be understood that embodiments of the disclosure can be employed for identification of drugs of abuse at other locations without limit.

Moreover, provided herein is a process for producing the kit, and method of using the kit. The kit includes a colorimetric reagent, a catalytic reagent, an absorbent material, solid support carriers and/or containers. The physical embodiment of the kit and its components can be provided in individual hermetically sealed light, air and moisture proof packaging for ease in transport, handling and long term storage prior to use.

Unlike current techniques for the identification of nicotine, cannabinoids and drugs of abuse on the surface of e-devices and in e-juice formulations, embodiments of the current disclosure have discovered, inter alia, that selected dry reactive dyes and catalytic reagents can be successfully mixed and packaged in various combinations to provide a highly selective, cheap, mass producible, portable detection device for the presumptive identification of nicotine, cannabinoids and drugs of abuse on the surface of e-devices and in e-juice formulations and provide operator safety when using said device.

Vaping

Historically, the origins of vaping go back to 1927 and a man called Joseph Robinson, who first came up with the idea of the electronic cigarette (EC). In 1963, Herbert Gilbert, made a smokeless, non-tobacco cigarette and finally in the mid-2000's, Hon Lik, of China made the first modern vaping device.[6]

Use of EC has dramatically increased in the United States since 2010 with 37% between 2014 and 2019.[3] Concerns about the possibility of adverse health effects to primary users and people exposed to EC vapors has also risen dramatically. EC and vaping juices have many formulations, predominantly containing propylene glycol, glycerol, nicotine and flavorings.[1][2] It is widely reported that many of the e-juice components form aldehydes during the heating process and subsequent thermal decomposition, which are then inhaled by the user.[1][2] The levels of these toxic aldehydes, exceed occupational safety standards.[1]

Production of aldehydes was found to be exponentially dependent on concentration of flavoring compounds.[1] Exposure to these aerosols can affect organ systems and especially cardiovascular and lung function.[2] The seven most popular online manufacturers or distributors of e-juices, were identified. Six samples from two manufacturers labeled as 0 mg/ml nicotine, were found to contain nicotine in amounts ranging from 5.7 mg/ml to 23.9 mg/ml. This study demonstrates nicotine labeling inaccuracies present in current e-juice formulations produced in the U.S.[2]

While legitimate reasons for ad ministering therapeutic products via a "vaping" format exist, it cannot be denied that vaping is a gateway method into other forms of narcotic abuse, for example, deodorized cannabis extracts can be vaped with minimal annoyance to the people around, thus greatly reducing the chances of detection.[4] E-juices, with added drugs of abuse, are freely available online, despite their lack of quality control, toxicological and clinical assessment.[4]

In addition to cannabis, vaping devices can be used to for many types of psychoactive drugs, such as methamphetamine, cocaine, heroin, or bath salts (cathinones). It should also be understood, that there is a very small leap to the infusion of fentanyl analogues, into these formulations. Simple modification of commercially available electronic vaping devices allow potent hallucinogens, such as dimethyltryptamine or DMT, to be vaped. Many websites and e-forums exist online discussing these modifications.[4][5]

Reports of people ingesting restricted substances from vaping devices, is increasing. For example, athletes testing positive for banned substances, ingested from "friends" e-cigarettes, alkaloid and opioid overdoses from vaping juices, and even commercial transit operators consuming illicit substances in the workplace with vaping devices, are becoming more frequent.[7]

The US Center for Disease Control, Food and Drug Administration (FDA), State and local health departments, and other clinical and public health partners, are investigating a multistate outbreak of lung injuries associated with vaping product use. There have been 805 lung injury cases reported from 46 states and 1 U.S. territory and it is estimated 77% of consumed e-juices, contained cannabis products. To date twelve deaths have been confirmed in 10 states.[8]

World authorities are now moving against the global vaping phenomenon, with the Trump administration preparing to ban flavoured e-juices and the FDA finalizing policy to remove all non-tobacco flavoured products.[9]

Clearly there is an urgent need for simple, hand held, highly mobile, cheap, mass producible test device that can rapidly, presumptively identify harmful and illicit substances within e-liquids and vaping products, as they are commercially produced, homemade or clandestine counterfeit formulations.

Smoking Vapors

WO 2019/079860A1 describes a method of plume, vapour detection of narcotic analyte compounds in air by use of sophisticated electronic instrumentation, specifically fluorescence spectroscopy.

U.S. Pat. No. 4,353,886A describes a method using antibodies adhered to a test plate to detect airborne narcotic vapours.

WO 2013/188675A1 describes a method using an imprinted thin film polymer, with electrically conductive sensing material having affinity for binding with, and capable of being deprotonated by, the airborne contaminant, including many harmful compounds. The electronic conductivity is achieved by $\pi$ electron-conjugated polymer, including: polyalinine; polypyrrole; polythiophene, which can detecting carbon monoxide, nicotine, 4-(methylnitrosamino)-1-(3-pyridyl)-1-butanone, formaldehyde, acetaldehyde.

CN 106124649A describes a method comprising a smoking simulation device which artificially smokes the electronic cigarette, thus atomising the tobacco liquid as atomized steam and utilises a laboratory gas chromatography coupled with mass spectrometry to detect nicotine metabolites.

U.S. Pat. No. 7,052,468B2 describes an acoustic wave electronic sensors to detect exhaled smoke from the breath of smokers, which it claims can detect metabolites of nicotine.

U.S. Pat. No. 9,726,684B1 describes a Xanthene based fluorophore, which fluoresces in the presence of cannabinoid species in the breath of subjects.

U.S. Pat. No. 7,052,468B2 describes the use of semiconductor, aptamer and conductive polymer and amplifying fluorescent polymer gas sensor technology, assisted by pulsed laser evaporation, and pulsed laser assisted surface functionalization, to analyse contaminants in gas plumes. Specifically it detects contaminants related to smoking activities.

U.S. Pat. No. 10,408,850 describes a method of fluorescence spectroscopy for exhaled plume analysis of alcohol and THC.

The above-identified disclosures relate to the analysis of cigarette airborne gaseous plumes created during smoking and pyrolysis of cigarette contents. Unlike the disclosed embodiments, these references utilize sophisticated laboratory instrumentation and procedures and do not relate to the current patent application disclosures or claims of a simple device, for the identification of nicotine, cannabinoids and other drugs of abuse on the surface of e-devices or in the e-juice formulations.

Bodily Fluids

US 2003/0003587A1 describes a method using luminescent lanthanide molecules affixed to flexible membranes to detect narcotic vapors in bodily fluids.

WO 1994/017416A1 describes a method using either thiobarbituric acid, barbituric acid and Meldrum's Acid reagents to bind to a nicotine metabolites in urine causing a color change which is then detected using UV/VIS spectrometry at wavelengths between 400 nm and 650 nm, thus estimating the concentration of consumed nicotine.

U.S. Pat. No. 8,785,205B2 describes an assay for detection of nicotine metabolites, in body fluid sample, by reacting with the metabolites with a cyanogen halide and a pyrazolone compound, producing a presumptive color change and detecting said color change with a UV/VS spectrometer.

U.S. Pat. No. 4,184,850 describes methods for ketone analysis in the breath and bodily fluids, for insulin production monitoring in diabetics. The device uses sodium nitroprusside, a water-soluble lower amino acid, an alkaline buffer substance, to facilitate colorimetric reactions.

The above-identified references relate to the analysis of nicotine and ketone metabolites in bodily fluids which may be related to consumption of cigarettes. Unlike the disclosed embodiments, these references utilise sophisticated laboratory instrumentation and procedures and do not relate to the current patent application disclosures or claims of a simple device, for the identification of nicotine, cannabinoids and other drugs of abuse on the surface of e-devices or in the e-juice formulations.

Water Bodies

U.S. Pat. No. 5,498,547A describes the use of buffers and pH dye's for the detection of polymeric bi-guanides, which have anti-microbial properties and useful for maintaining swimming pool water quality. Disclosed dyes include, bromothymol blue, bromophenol blue, bromocresol green, bromochlorophenol blue, bromocresol purple, 3,4,5,6-tetrabromophenolphthalein, ethyl ester, tetrabromophenol blue, and 3',3",5',5"-tetraiodophenolsulfonephthalein. tetrabromophenolphthalein.

The disclosure fails to mention use of these dyes for detection of harmful organic contaminants, drugs of abuse, nicotine or cannabinoids and thus unlike the current invention.

E-Devices

Literature cites the use of sophisticated instrumentation and laboratory procedures, for the identification of individual components in vaping juice formulations, including but not limited to HPLC,[3] DART-MS, LC-MS and GC-MS.[7]

U.S. Pat. No. 5,780,051 discloses a method to detect nicotine by reacting it with a cyanogen releasing reagent cyanogen halide forming reagent and buffer, which produces a presumptive color indication. The said reagents are embedded into a layered porous matrix in a strip format. It uses diethylthiobarbiturate, citrate buffer, potassiumthiocyanate and chloramine T as reagents and is designed for biological fluid analysis. This device cannot be used as described in the current patent application, for surface analysis of e-cigarettes or e-juice sampling and detection of nicotine, cannabinoids and/or other drugs of abuse.

US 2019/0120769A1 describes an e-cigarette, which contains, chromium ions and a pH color change reagent, adsorbed onto activated carbon embedded into a modified polypropylene mouthpiece. Said mouthpiece produces color changes as the chromium ions react with any organic molecules atomised during smoking and passing through the mouthpiece. The described invention relates to consumption of e-juice and not detection of harmful compounds, nicotine, cannabinoids or other drugs of abuse. The device fails to explain what pH indicator is used and the fact that a redox indicating dye would be needed for detection in the changes of chromium ionisation state as it reacts with organic species. Also the disclosure fails to describe how bodily fluids imparted to the device from human lips, breath, backflow etc, which will also react with the chromium ions thus giving a false consumption rate with the development of color. Ultimately, the disclosure bares no similarity to the current patent application and fails to identify and drugs of abuse, nicotine or cannabinoids, in home-made, counterfeit, clandestine and/or commercial available e-liquid formulations.

CN 106442501A Discloses a method for detecting nicotine content of e-liquids, comprising: a) sample collection from e-liquid, (b) dissolving the sample in isopropyl alcohol, (c) addition of cyanogen producing reagent and a cyanogen detection reagents to create a color change with the nicotine (d) the solution is then placed into UV/VIS continuous flow detection spectrometer at 450~480 nm.

US 2017/0020195 Discloses a computerised device to analyse the plume of vapour extracted from an e-juice device. It utilises a robotic vapor extraction.

The above-identified disclosures relate to the analysis of gaseous plume from an e-cigarette device. Specifically the disclosures relate to the measurement of the consumption rate of e-juices in the device or correct quantities of vaporised components in the vapour. Unlike the current methods and kits, these disclosures utilise sophisticated laboratory instrumentation and procedures and do not relate to the current patent application disclosures or claims of a device, for the identification of nicotine, cannabinoids and other drugs of abuse on the surface of e-devices or in the e-juice formulations.

The disclosures identified above differ greatly in modality, construction, end use, to that of the kit described in the current application. Those described above are either for conventional cigarette smoke analysis, biological fluid analysis, water analysis, are based on immunoassay antibody detection techniques, require electronics, utilize large volumes of hazardous solvent and reagents, are mostly suited to laboratory use, and all have multiple steps and require large amounts of time to do a single complete analysis without achieving the identification of nicotine, cannabinoids and other drugs of abuse on the surface of e-devices or in the e-juice formulations.

Embodiments of the present disclosure describe a cheap, mass producible, highly portable, paper strip and swab device which requires little training and produces a visual presumptive colorimetric indication of nicotine, cannabinoids and other drugs of abuse on the surface of e-devices or in the e-juice formulations.

The preceding summary, of patent references and public domain literature and disclosures, does not intend to limit itself to these examples. They are provided only as a point of reference in the difference between laboratory equipment and procedures and true single step, cheap mass producible, field deployable presumptive colorimetric test kit for the identification of nicotine, cannabinoids and other drugs of abuse on the surface of e-devices or in the e-juice formulations, as disclosed in the current application.

Solid Support Carrier

As described herein, suitable solid support substrates to which the dry reactive dye's and catalytic reagents are adhered to, adsorbed to, or absorbed into, is dictated only by end use requirements.

In accordance with the disclosed embodiments, and without limitation, the solid support carrier can be a paper card, a paper sheet, synthetic paper, Whatman filter paper, polypropylene or polyethylene synthetic paper, or similar.

The solid support may have the reactive reagents (e.g., the colorimetric reagent and the catalytic reagent) applied by dip-drying processes and/or any large scale printing process including but not limited to: letterpress, rotary gravure, rotary screen printing, flat screen printing, tampography, wax printing, contact dosing, ultrasonic sputter, flexographic, spray and drop on demand printing, may be adapted for use. These methods are well known in the art.

Swab

In accordance with the current invention and without limitation, in one embodiment, the sample swab is a dry cotton swab.

Presumptive Colorimetric Reagent

Figure 5A:
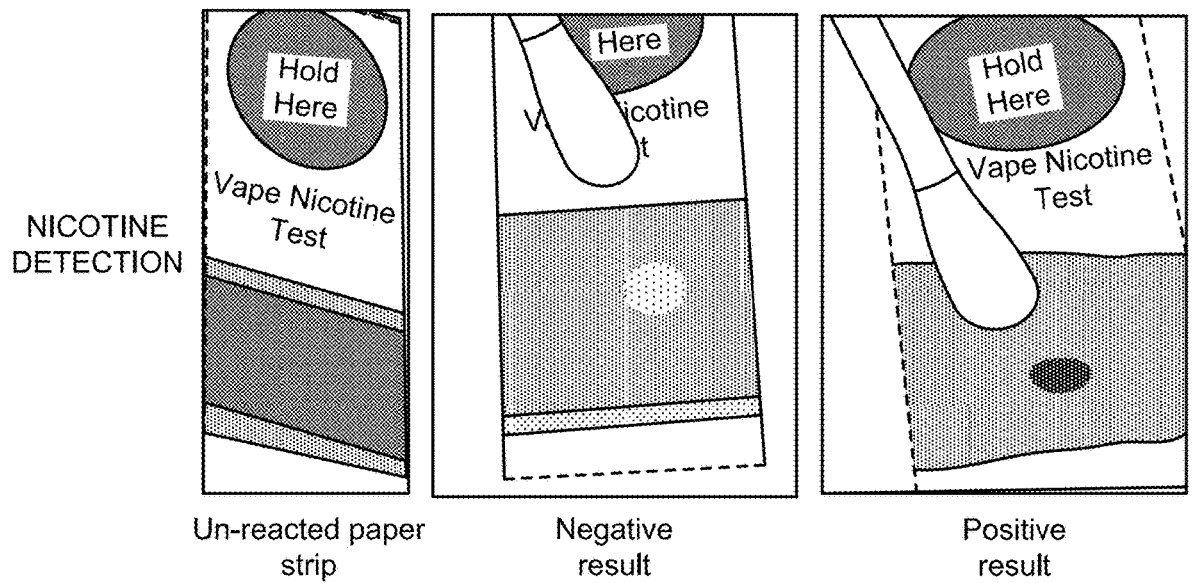
FIG. 5A illustrates a schematic of the color change for nicotine detection (left: un-reacted paper strip; middle: negative result; right: positive result).
Figure 5B:
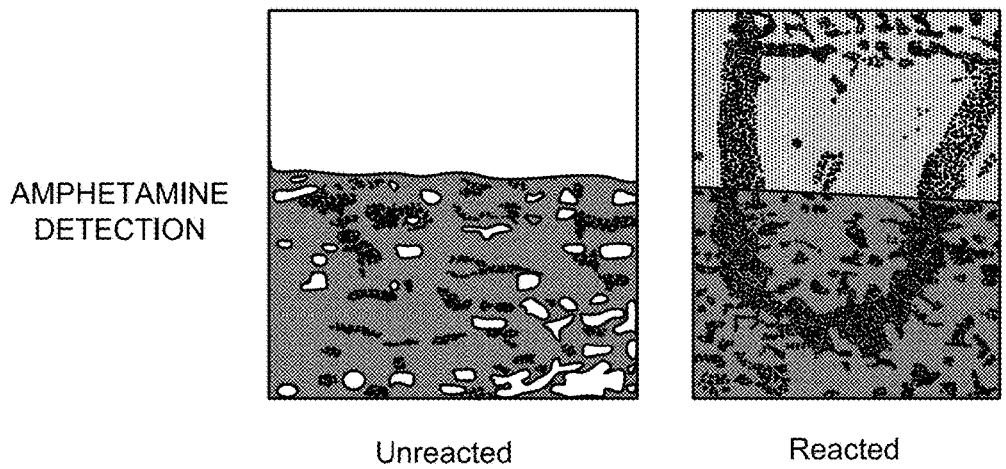
FIG. 5B illustrates a schematic of the color change for amphetamine detection (left: unreacted; right: reacted).
Figure 5C:
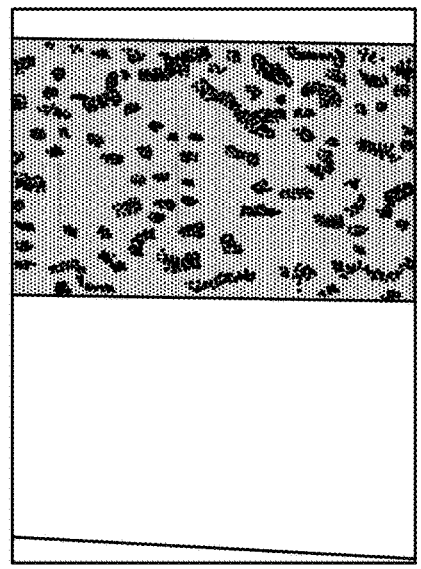
FIG. 5C illustrates a schematic of the color change for cannabinoid detection (left: unreacted; right: reacted (red)).
Figure 5C:
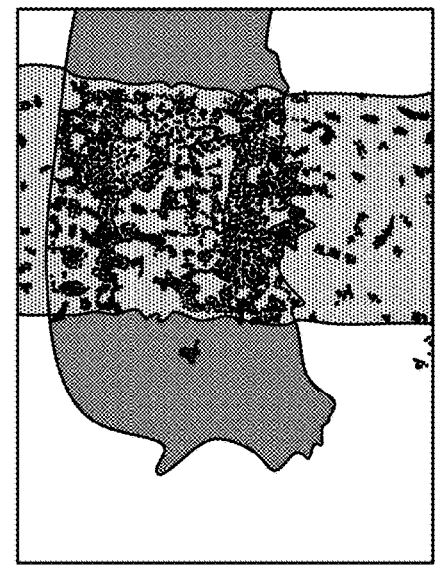
Figure 5D:
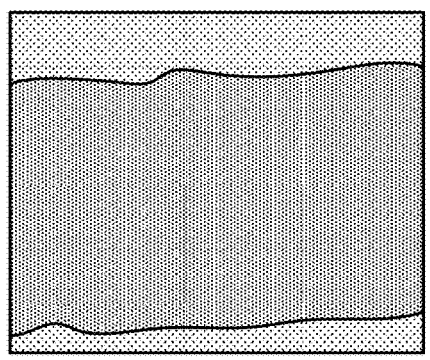
FIG. 5D illustrates a schematic of the color change for opioid detection (left: unreacted; right: reacted).
Figure 5D:
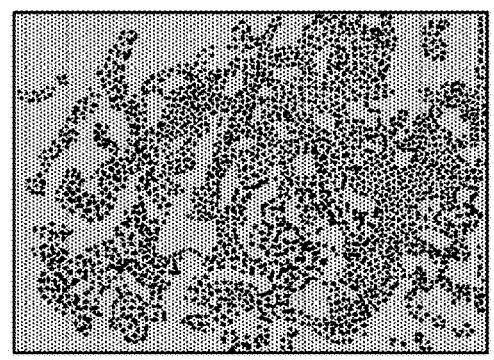

The presumptive colorimetric reagent of the kits and methods herein produces a known visual color indication in the presence of nicotine, cannabinoids and other drugs of abuse (e.g., on the surface of e-devices or in the e-juice formulations). Schematics depicting the chemical color change are depicted in FIGS. 5A-5D.

In accordance with embodiments of the current disclosure and without limitation, a suitable presumptive colorimetric dye for the presumptive identification of nicotine, cannabinoids and other drugs of abuse on the surface of e-devices or in the e-juice formulations, may be selected from a group consisting of but not limited to: 3',3",5',5"-Tetraiodophenolsulfonephthalein, tetrabromophenolphthalein ethyl ester and its salts (e.g., potassium salts), bromophenol blue, chlorophenol red, congo red, methyl yellow, methyl orange, methyl purple, methyl red, ethyl orange, 4-(4-dimethylamino-1-naphthylazo)-3-methoxybenzenesulfonic acid, Fast blue B salt, bromocresol green, Fast Black K salt, bromothymol blue, bromochlorophenol blue, bromocresol purple, 3,4,5,6-tetrabromophenolphthalein ethyl ester and it salts (e.g., potassium salts), tetrabromophenol blue and tetrabromophenolphthalein, 4-bromobenzenediazonium tetrafluoroborate.

Catalytic Reagent

In accordance with the current invention and without limitation, in one embodiment, a suitable method of providing the catalytic reagent is as an acid, a mineral acid or organic acid, solid or liquid. An exemplary selection of solid acids are tartaric acid, oxalic acid, sodium bisulfate or citric acid.

Packaging

In accordance with the current invention and without limitation, in one embodiment, the kit, the absorbent material (e.g., a collection swab) can be packaged in moisture and UV resistant packages prior to use. Preferably the packaging would be a tare open, form, fill and seal sachet. The sachet would be constructed from commercially available Paper/PET12 um/AL7 um/PE50 product, which is an extremely cheap, mass produced material. The dry mineral paper strip, can be packaged individually in separate paper based sachets. All sachets are formed by vertical and/or horizontal form/seal machines, which are well known in the art.

Use of Kit

In accordance with embodiments of the present disclosure and without limitation, the kit can be carried in a pocket, belt case, glove box, brief case, etc. and where a suspect e-device or e-juice residue is observed, both the absorbent material and the solid support carrier with reaction zone thereon (e.g., a reactive paper strip) are removed from respective sachet packaging. The absorbent material is rubbed onto mouthpiece of suspect e-device, or a sample of suspected e-juice is collected into the absorbent material to facilitate the collection of a representative sample of the suspect residue.

In examples, to complete the process, the absorbent material is transferred to the reaction zone of the solid support carrier, which contains printed and/or pre-adsorbed colorimetric and catalytic reagents, pressed onto and dabbed onto the paper strip reaction zone, thus facilitating full mixing of all components and enhancing any presumptive colorimetric indication for the identification of nicotine, cannabinoids and other drugs of abuse on the surface of e-devices or in the e-juice formulations.

Color Indications

In one embodiment and in accordance with the current invention and without limitation, example results from using the kit of the current invention are provided: (Control—Negative) no color change—Yellow, (Positive Nicotine Indication) Color Rapid change from Yellow to Blue, (Positive Amphetamine Indication) Color Rapid change from Yellow to Blue.

In another embodiment and in accordance with the current invention and without limitation, example results from using the kit of the current invention are provided: (Control—Negative) no color change—light brown, (Positive Cannabinoid Indication) Color Rapid change from Brown to Pink/Red, (Positive Amphetamine Indication) Color Rapid change from Brown to Purple.

In yet another embodiment and in accordance with the current invention and without limitation, example results from using the kit of the current invention are provided: (Control—Negative) no color change—brown, (Positive Cannabinoid Indication) Color Rapid change from Brown to Purple, (Positive Amphetamine Indication) Color Rapid change from Brown to Red.

In yet another embodiment and in accordance with the current invention and without limitation, example results from using the kit of the current invention are provided: (Control—Negative) no color change—Tan, (Positive Opioid Indication) Color Rapid change from Tan to Red, or dark brown, or black. The exact color change can be based on the selection of colorimetric dye.

General Definitions

The following definitions are included for the purpose of understanding the present subject matter and for constructing the appended patent claims. The abbreviations used herein have their conventional meanings within the chemical and biological arts.

While various embodiments and aspects of the present invention are shown and described herein, it will be obvious to those skilled in the art that such embodiments and aspects are provided by way of example only. Numerous variations, changes, and substitutions will now occur to those skilled in the art without departing from the invention. It should be understood that various alternatives to the embodiments of the invention described herein may be employed in practicing the invention.

The section headings used herein are for organizational purposes only and are not to be construed as limiting the subject matter described. All documents, or portions of documents, cited in the application including, without limitation, patents, patent applications, articles, books, manuals, and treatises are hereby expressly incorporated by reference in their entirety for any purpose.

Unless defined otherwise, technical and scientific terms used herein have the same meaning as commonly understood by a person of ordinary skill in the art. See, e.g., Singleton et al., DICTIONARY OF MICROBIOLOGY AND MOLECULAR BIOLOGY 2nd ed., J. Wiley & Sons (New York, NY 1994); Sambrook et al., MOLECULAR CLONING, A LABORATORY MANUAL, Cold Springs Harbor Press (Cold Springs Harbor, NY 1989). Any methods, devices and materials similar or equivalent to those described herein can be used in the practice of this invention. The following definitions are provided to facilitate understanding of certain terms used frequently herein and are not meant to limit the scope of the present disclosure.

"Patient" or "subject in need thereof" refers to a living member of the animal kingdom suffering from or who may suffer from the indicated disorder. In embodiments, the subject is a member of a species comprising individuals who may naturally suffer from the disease. In embodiments, the subject is a mammal. Non-limiting examples of mammals include rodents (e.g., mice and rats), primates (e.g., lemurs, bushbabies, monkeys, apes, and humans), rabbits, dogs (e.g., companion dogs, service dogs, or work dogs such as police dogs, military dogs, race dogs, or show dogs), horses (such as race horses and work horses), cats (e.g., domesticated cats), livestock (such as pigs, bovines, donkeys, mules, bison, goats, camels, and sheep), and deer. In embodiments, the subject is a human.

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

It is understood that where a parameter range is provided, all integers within that range, and tenths thereof, are also provided by the invention. For example, "0.2-5 mg" is a disclosure of 0.2 mg, 0.3 mg, 0.4 mg, 0.5 mg, 0.6 mg etc. up to and including 5.0 mg.

As used in the description herein and throughout the claims that follow, the meaning of "a," "an," and "the" includes plural reference unless the context clearly dictates otherwise.

By, "small molecule" may be referred to broadly as an organic, inorganic or organometallic compound with a low molecular weight compound (e.g., a molecular weight of less than about 2,000 Da or less than about 1,000 Da). The small molecule may have a molecular weight of less than about 2,000 Da, a molecular weight of less than about 1,500 Da, a molecular weight of less than about 1,000 Da, a molecular weight of less than about 900 Da, a molecular weight of less than about 800 Da, a molecular weight of less than about 700 Da, a molecular weight of less than about 600 Da, a molecular weight of less than about 500 Da, a molecular weight of less than about 400 Da, a molecular weight of less than about 300 Da, a molecular weight of less than about 200 Da, a molecular weight of less than about 100 Da, or a molecular weight of less than about 50 Da.

Small molecules are organic or inorganic. Exemplary organic small molecules include, but are not limited to, aliphatic hydrocarbons, alcohols, aldehydes, ketones, organic acids, esters, mono- and disaccharides, aromatic hydrocarbons, amino acids, and lipids. Exemplary inorganic small molecules comprise trace minerals, ions, free radicals, and metabolites. Alternatively, small molecules can be synthetically engineered to consist of a fragment, or small portion, or a longer amino acid chain to fill a binding pocket of an enzyme. Typically small molecules are less than one kilodalton.

As used herein, the term "stereoisomers" refers to compounds made up of the same atoms having the same bond order but having different three-dimensional arrangements of atoms that are not interchangeable. The three-dimensional structures are called configurations. As used herein, the term "enantiomers" refers to two stereoisomers that are non-superimposable mirror images of one another. As used herein, the term "optical isomer" is equivalent to the term "enantiomer". As used herein the term "diastereomer" refers to two stereoisomers which are not mirror images but also not superimposable. The terms "racemate", "racemic mixture" or "racemic modification" refer to a mixture of equal parts of enantiomers. The term "chiral center" refers to a carbon atom to which four different groups are attached. Choice of the appropriate chiral column, eluent, and conditions necessary to effect separation of the pair of enantiomers is well known to one of ordinary skill in the art using standard techniques (see e.g. Jacques, J. et al., "Enantiomers, Racemates, and Resolutions", John Wiley and Sons, Inc. 1981).

By "alteration" is meant a change (increase or decrease) in the presence of the small molecule, e.g., nicotine, cannabinoids and other drugs of abuse, as detected by standard methods known in the art such as those described herein. As used herein, an alteration includes a 10% or more change in presence, preferably a 25% change, more preferably a 40% change, and most preferably a 50% or greater change in the presence.

As used herein an "alteration" also includes a 2-fold or more change, for example, 5-fold, 10-fold, 20-fold, 30-fold, 40-fold, 50-fold, 100-fold, 500-fold, 1000-fold or more.

The term "sample" as used herein refers to a biological sample obtained for the purpose of evaluation in vitro. In embodiments, the sample may comprise a body fluid. In some embodiments, the body fluid includes, but is not limited to, whole blood, plasma, serum, lymph, breast milk, saliva, mucous, semen, cellular extracts, inflammatory fluids, cerebrospinal fluid, vitreous humor, tears, vitreous, aqueous humor, or urine obtained from the subject. In some aspects, the sample is a composite panel of two or more body fluids. In exemplary aspects, the sample comprises blood or a fraction thereof (e.g., plasma, serum, or a fraction obtained via leukapheresis).

A "control" sample or value refers to a sample that serves as a reference, usually a known reference, for comparison to a test sample. For example, a test sample can be taken from a test subject, and compared to samples from known conditions, e.g., a subject (or subjects) that does not have the disease (a negative or normal control), or a subject (or subjects) who does have the disease (positive control). A control can also represent an average value gathered from a number of tests or results. One of skill in the art will recognize that controls can be designed for assessment of any number of parameters. One of skill in the art will understand which controls are valuable in a given situation and be able to analyze data based on comparisons to control values. Controls are also valuable for determining the significance of data. For example, if values for a given parameter are variable in controls, variation in test samples will not be considered as significant.

As used herein, "salts" or "salt form" or "pharmaceutically accepted salts" may include base addition salts (formed with free carboxyl or other anionic groups) which are derived from inorganic bases such as, for example, sodium, potassium, ammonium, calcium, or ferric hydroxides, and such organic bases as isopropylamine, trimethylamine, 2-ethylamino-ethanol, histidine, procaine, and the like. Such salts are formed as acid addition salts with any free cationic groups and generally are formed with inorganic acids such as, for example, hydrochloric, sulfuric, or phosphoric acids, or organic acids such as acetic, citric, p-toluenesulfonic, methanesulfonic acid, oxalic, tartaric, mandelic, and the like. Salts of the disclosure may include amine salts formed by the protonation of an amino group with inorganic acids such as hydrochloric acid, hydrobromic acid, hydroiodic acid, sulfuric acid, phosphoric acid, and the like. Salts of the disclosure also include amine salts formed by the protonation of an amino group with suitable organic acids, such as p-toluenesulfonic acid, acetic acid, and the like. Additional excipients which are contemplated for use in the practice of the present disclosure are those available to those of ordinary skill in the art, for example, those found in the United States Pharmacopoeia Vol. XXII and National Formulary Vol. XVII, U.S. Pharmacopoeia Convention, Inc., Rockville, Md. (1989), the relevant contents of which is incorporated herein by reference.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may include 1 to 10, 1 to 20, 1 to 30, and 1 to 40 in one direction, or 50 to 40, 50 to 30, 50 to 20, and 50 to 10 in the other direction.

The term "weight percent" or "% (w/w)" refers to a percentage of a component in a solution that is calculated on the basis of weight for the component and the solvent. For example, a 1% (w/w) solution of a component would have 1 g of the component dissolved in a 100 g of solvent. The term "volume percent" or "% (v/v)" refers to a percentage of a component in a solution that is calculated on the basis of volume for the component and the solvent. For example, a 1% (v/v) solution of a component would have 1 ml of the component dissolved in a 100 ml of solvent. The term "weight/volume percent" or "% (w/v)" refers to a percentage of a component in a solution that is calculated on the basis of weight for the component and on the basis of volume for the solvent. For example, a 1.0% (w/v) solution of a component would have 1 g of the component dissolved in a 100 ml of solvent.

EXAMPLES

The following examples illustrate certain specific embodiments of the invention and are not meant to limit the scope of the invention.

Embodiments herein are further illustrated by the following examples and detailed protocols. However, the examples are merely intended to illustrate embodiments and are not to be construed to limit the scope herein. The contents of all references and published patents and patent applications cited throughout this application are hereby incorporated by reference.

Example 1

In accordance with the current invention and without limitation, a presumptive kit for the detection and identification of nicotine and other drugs of abuse, a solution of 3',3",5',5"-Tetraiodophenolsulfonephthalein and citric acid and methanol in ratio (1:5:100) is dissolved with agitation.

A paper strip of the colorimetric reagent is made by dip drying a sheet of Whatman No. 1 filter paper into said solution, and cutting dried sheet into strips and packaging said strips. The swab and pre-absorbed strip are packaged individually into hermetically form fill sealed Paper/PET12 um/AL7 um/PE50 sachet.

Example 2

In accordance with the current invention and without limitation, a presumptive kit for the detection and identification of nicotine and other drugs of abuse, a solution of 3',3",5',5"-Tetraiodophenolsulfonephthalein and citric acid and methanol in ratio (1:5:100) is dissolved with agitation.

Rolls or sheets of polypropylene or polyethylene synthetic paper are passed through any large scale printing machine including but not limited to: letterpress, rotary gravure, rotary screen printing, flat screen printing, tampography, wax printing, contact dosing, ultrasonic sputter, flexographic, spray and drop on demand printing, may be adapted for use.

The reactive solution is printed to said paper and air dried in large scale automated drying conveyor systems, well known in the art. Rolls and sheets of printed reactive zones may be cut and/or formed into any shape as required. The swab and printed strip are packaged individually into hermetically form fill sealed Paper/PET12 um/AL7 um/PE50 sachet.

While the disclosed test kit of the current invention has been shown and described in detail, this invention is not to be considered as limited to the exact form disclosed, and that changes in detail and construction may be made therein within the scope of the invention without departing from the spirit thereof.

OTHER EMBODIMENTS

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

The patent and scientific literature referred to herein establishes the knowledge that is available to those with skill in the art. All references, e.g., U.S. patents, U.S. patent application publications, PCT patent applications designating the U.S., published foreign patents and patent applications cited herein are incorporated herein by reference in their entireties. Genbank and NCBI submissions indicated by accession number cited herein are incorporated herein by reference. All other published references, documents, manuscripts and scientific literature cited herein are incorporated herein by reference. In the case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

REFERENCES

Patent Documents

WO 2019/079860A1 Detection method.
US 2003/0003587A1 Molecularly imprinted polymer based sensors for the detection of narcotics.
U.S. Pat. No. 4,353,886A Method for detecting organic vapors.
WO 2013/188675A1 Systems, sensing devices and methods for detection of airborne contaminants.
CN 106124649 A detection method for content uniformity of nicotine in atomized steam released by electronic cigarette
U.S. Pat. No. 7,052,468B2 Method and apparatus for detecting environmental smoke exposure.
WO 1994/017416A1 Method of assaying.
U.S. Pat. No. 9,726,684B1 Compositions for target substance detection and measurement.
U.S. Pat. No. 7,052,468B2 Method and apparatus for detecting environmental smoke exposure.
U.S. Pat. No. 4,184,850 Methods and articles of manufacture for nicotine cessation and monitoring nicotine use.
U.S. Pat. No. 8,785,205B2 Detection of nicotine metabolites.
US 2019/0120769A1 Colorimetric aerosol and gas detection for aerosol delivery device
CN 106442501A Detection method of nicotine content of cigarette liquid of electronic cigarette.
U.S. Pat. No. 4,184,850 Diagnostic agent for the detection of ketone bodies in fluids and process for its manufacture.
US 2017/0020195 Electronic Vaporizer Testing.
U.S. Pat. No. 10,408,850 Method for target substance detection and measurement.
U.S. Pat. No. 5,498,547A Method and device for the determination of polymeric biguanides in aqueous fluids.

OTHER REFERENCES

[1] http://tobacco.cleartheair.org.hk/wp-content/uploads/2016/11/Vape-aldehydes-Khlystov.pdf Flavoring Compounds Dominate Toxic Aldehyde Production during E-Cigarette Vaping Andrey Khlystov* and Vera Samburova

[2] https://www.facetsjournal.com/doi/pdf/10.1139/facets-2017-0014

[3] Barre, H. R. e Nicotine Content of a Sample of E-cigare e Liquid Manufactured in the United States. Brigham Young University. Brigham Young University BYU Scholars Archive. 2017.

[4] Giroud, C., et. al. E-Cigarettes: A Review of New Trends in Cannabis Use. Int. J. Environ. Res. Public Health 2015, 12, 9988-10008.

[5] https://www.ncbi.nlm.nih.gov/books/NBK507184/

[6] https://vapingdaily.com/what-is-vaping/vaping-history/

[7] https://www.ncjrs.gov/pdffilesl/nij/grants/251788.pdf

[8] https://www.cdc.gov/tobacco/basic information/e-cigarettes/severe-lung-disease.html

[9] https://www.cnbc.com/2019/09/11/trump-to-consider-e-cigarette-policy-amid-outbreak-of-lung-disease.html

What is claimed:

1. A portable detection kit for identifying at least one target drug of abuse comprising:
   a dry reaction zone that was printed onto the solid support and affixed thereto comprising a mixture of a 3',3",5',5"-Tetraiodophenolsulfonephthalein and a catalytic reagent selected from the group consisting of a mineral acid, an oxalic acid, a citric acid, sodium bisulfate and any combination thereof; and
   a separate absorbent material;
   wherein the 3',3",5',5"-Tetraiodophenolsulfonephthalein and the catalytic reagent are configured to undergo chemical reaction with at least one target drug of abuse to produce a visible color change; and
   wherein the at least one target drug of abuse is selected from the group consisting of nicotine, cannabinoids, amphetamines, opioids, or cocaine; and
   wherein the catalytic reagent increases the rate of appearance of the visible color change resulting from chemical reaction between the 3',3",5',5"-Tetraiodophenolsulfonephthalein and the at least one target drug of abuse; and
   wherein a ratio of the 3',3",5',5"-Tetraiodophenolsulfonephthalein and the catalytic reagent in the mixture is about 1:1 by weight to about 1:5 by weight.

2. A portable detection kit as in claim 1, wherein the 3',3",5',5"-Tetraiodophenolsulfonephthalein and catalytic reagent are configured to undergo chemical reaction with the at least one target drug of abuse in the form of liquids, gels or solid powders that are pure or admixed with a cutting agent.

3. The portable detection kit of claim 1, wherein the catalytic reagent is in a solid form and comprises at least one of oxalic acid, citric acid, or sodium bisulfate.

4. The portable detection kit of claim 1, wherein the separate absorbent material is a cotton swab, or wipe formed from natural or synthetic fibers.

5. The portable detection kit of claim 4, wherein the separate absorbent material is packaged in a container.

6. The portable detection kit of claim 5, wherein the container is in the form of a form fill seal pouch 12 micron thick, aluminum 7 micron thick, polyethylene 50 micron thick, or a heat seal pouch.

7. The portable detection kit of claim 1, wherein the solid support is a paper card, a paper sheet, synthetic paper, Whatman filter paper, polypropylene, or polyethylene synthetic paper.

8. A portable detection kit for identifying at least one target drug of abuse comprising:
   a dry reaction zone that was printed onto the solid support and affixed thereto comprising a mixture of a 3',3",5',5"-Tetraiodophenolsulfonephthalein and a catalytic reagent selected from the group consisting of a mineral acid, an oxalic acid, a citric acid, sodium bisulfate and any combination thereof; and
   a separate absorbent material;
   wherein the 3',3",5',5"-Tetraiodophenolsulfonephthalein and the catalytic reagent are configured to undergo chemical reaction with at least one target drug of abuse to produce a visible color change; and
   wherein the at least one target drug of abuse is selected from the group consisting of nicotine, cannabinoids, amphetamines, opioids, or cocaine; and
   wherein the catalytic reagent increases the rate of appearance of the visible color change resulting from chemical reaction between the 3',3",5',5"-Tetraiodophenolsulfonephthalein and the at least one target drug of abuse; and
   wherein the 3',3",5',5"-Tetraiodophenolsulfonephthalein and the catalytic reagent are combined in a ratio of about 6 g to about 9 g 3',3",5',5"-Tetraiodophenolsulfonephthalein: about 50 g to about 70 g catalytic reagent.

9. A method of fabricating a portable detection kit of claim 1, comprising:
   preparing a dry mixture including 3',3",5',5"-Tetraiodophenolsulfonephthalein and a dry catalytic reagent;
   affixing the dry mixture to a solid support carrier to form a reaction zone thereon, thereby forming the portable detection kit of claim 1.

* * * * *